(12) United States Patent
Koh et al.

(10) Patent No.: US 11,827,123 B2
(45) Date of Patent: Nov. 28, 2023

(54) SEAT FOR VEHICLE AND METHOD OF CONTROLLING THE SAME

(71) Applicant: HYUNDAI TRANSYS INCORPORATED, Seosan-si (KR)

(72) Inventors: Sang Kyung Koh, Yongin-si (KR); In Gyu Jang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 360 days.

(21) Appl. No.: 17/398,346

(22) Filed: Aug. 10, 2021

(65) Prior Publication Data

US 2022/0134910 A1 May 5, 2022

(30) Foreign Application Priority Data

Oct. 30, 2020 (KR) .................. 10-2020-0143335

(51) Int. Cl.
  *B60N 2/02* (2006.01)
  *B60N 2/66* (2006.01)
  *B60N 2/90* (2018.01)
  *B60N 2/80* (2018.01)

(52) U.S. Cl.
  CPC .......... *B60N 2/0244* (2013.01); *B60N 2/665* (2015.04); *B60N 2/80* (2018.02); *B60N 2/914* (2018.02); *B60N 2/976* (2018.02); *B60N 2/0268* (2023.08)

(58) Field of Classification Search
  CPC ...... B60N 2/0244; B60N 2/665; B60N 2/976; B60N 2/914; B60N 2/80; B60N 2/0268

USPC ........................................................ 701/49
See application file for complete search history.

(56) References Cited

U.S. PATENT DOCUMENTS

| 9,725,036 | B1 * | 8/2017 | Tarte | ............... B60W 50/16 |
| 10,210,409 | B1 * | 2/2019 | Migneco | .............. G06V 20/593 |
| 2017/0313314 | A1 * | 11/2017 | Sen | ...................... B60N 2/002 |
| 2018/0178696 | A1 * | 6/2018 | Dexter | ................. B60N 2/829 |
| 2020/0198465 | A1 * | 6/2020 | Tanabe | .................... G08G 1/00 |
| 2020/0223328 | A1 * | 7/2020 | Kobayashi | ............... B60N 2/01 |
| 2021/0016686 | A1 * | 1/2021 | Yetukuri | ............. B60N 2/5678 |
| 2023/0001129 | A1 * | 1/2023 | Ito | .......................... A61B 5/08 |
| 2023/0278565 | A1 * | 9/2023 | Okabe | ................... G06V 40/18 |
| | | | | 701/1 |

FOREIGN PATENT DOCUMENTS

KR   10-2018-0009409 A   1/2018

* cited by examiner

*Primary Examiner* — Yazan A Soofi
(74) *Attorney, Agent, or Firm* — Bridgeway IP Law Group, PLLC; Jihun Kim (57) ABSTRACT

Proposed are a seat for a vehicle and a method of controlling the same capable of sensing whether an occupant is snoring and of changing the posture of the occupant so as to induce sound sleep of the occupant. The seat for a vehicle includes a seat cushion, a seatback, a side bolster, a headrest, a sensing device mounted in the headrest to sense whether an occupant is on the seat and whether the occupant is snoring, a posture-changing device mounted in at least one of the seat cushion, the seatback, the side bolster, or the headrest to change the posture of the occupant, and a controller configured to determine whether the occupant is on the seat and whether the occupant is snoring based on a sensing signal output from the sensing device and to operate the posture-changing device.

12 Claims, 4 Drawing Sheets

SEAT FOR VEHICLE AND METHOD OF CONTROLLING THE SAME

CROSS-REFERENCE TO THE RELATED APPLICATION

This application claims priority from Korean Patent Application No. 10-2020-0143335, filed on Oct. 30, 2020, in the Korean Intellectual Property Office, the disclosure of which is incorporated herein by reference in its entirety.

BACKGROUND OF THE INVENTION

1. Field of the Invention

The present invention relates to a seat for a vehicle and a method of controlling the same, and more particularly to a seat for a vehicle and a method of controlling the same capable of sensing whether an occupant is snoring and of changing the posture of the occupant so as to induce sound sleep of the occupant.

2. Description of the Related Art

Vehicles are means for transporting persons or freight. With the advancement of industry and the increased frequency of use of vehicles, various convenience functions have been studied and applied to vehicles so as to provide various conveniences to occupants, in addition to a transportation function.

In particular, in recent years, research has been conducted on an autonomous driving system, which enables a vehicle to travel by itself without driving manipulation on the part of a driver, and on autonomous vehicles equipped with such autonomous driving systems.

However, most studies on autonomous vehicles have been focused on technology for ensuring the safety of vehicles and occupants, rather than functions for providing various conveniences to occupants.

Conventionally, because a driver is required to manually drive a vehicle, it is impossible for the driver to sleep while driving. Therefore, research has been conducted on a power seat that prevents a driver from dozing off while driving or enables a driver to drive a vehicle in a comfortable position.

In addition, recently developed autonomous vehicles enable a driver (an occupant) not only to drive a vehicle in a comfortable position but also to sleep while driving.

Therefore, the present applicant has conducted research on a convenience system associated with sleep of a driver (an occupant) of an autonomous vehicle.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

It is an object of the present invention to provide a seat for a vehicle and a method of controlling the same capable of sensing whether an occupant is snoring and of changing the posture of the occupant to a snoring prevention posture so as to induce sound sleep of the occupant.

In accordance with an aspect of the present invention, the above and other objects can be accomplished by the provision of a seat for a vehicle including a seat cushion, a seatback connected to the seat cushion, a first side bolster disposed on a right side of the seatback, a second side bolster disposed on a left side of the seatback, and a headrest connected to the seatback, the seat further including a sensing device mounted in the headrest to sense whether an occupant is on the seat and whether the occupant is snoring, a posture-changing device mounted in at least one of the seat cushion, the seatback, the side bolster, or the headrest to change the posture of the occupant, and a controller configured to determine whether the occupant is on the seat and whether the occupant is snoring based on a sensing signal output from the sensing device and to operate the posture-changing device.

The sensing device may include a capacitance sensor mounted in the headrest, a first detection sensor mounted above the capacitance sensor in the headrest to sense vibration and noise, and a second detection sensor mounted below the capacitance sensor in the headrest to sense vibration and noise.

The controller may change the posture of the occupant by changing at least one of the position or the orientation of each of the seat cushion, the seatback, and the headrest depending on whether the occupant is on the seat and whether the occupant is snoring based on the sensing signal output from the sensing device.

The posture-changing device may include a plurality of motors configured to be operated under the control of the controller. The plurality of motors may include a cushion operation motor provided in the seat cushion to change the position of the seat cushion in a forward-backward direction, a height direction, and a tilt direction, a back operation motor provided in the seatback to change the angle of the seatback, and a headrest operation motor provided in the headrest to change the position of the headrest in an upward-downward direction and in the forward-backward direction. The controller may control the operation of the cushion operation motor, the back operation motor, and the headrest operation motor.

The posture-changing device may include a plurality of air breathers configured to be operated under the control of the controller. The plurality of air breathers may include a first cushion air breather mounted in the seat cushion and disposed on the right side of the seat cushion, a second cushion air breather mounted in the seat cushion and disposed on the left side of the seat cushion, a first back air breather mounted in the seatback and disposed on the right side of the seatback, a second back air breather mounted in the seatback and disposed on the left side of the seatback, a first head air breather mounted in the headrest and disposed on the right side of the headrest, a second head air breather mounted in the headrest and disposed on the left side of the headrest, a first side air breather mounted in the first side bolster, and a second side air breather mounted in the second side bolster.

The plurality of air breathers may further include a plurality of lumbar air breathers mounted in the seatback and disposed separately from each other in the upward-downward direction.

The controller may change the posture of the occupant by operating air breathers disposed on a selected side among air breathers disposed on the left side of the occupant and air breathers disposed on the right side of the occupant among the plurality of air breathers depending on whether the occupant is snoring, as sensed by the sensing device.

In accordance with another aspect of the present invention, there is provided a method of controlling a seat for a vehicle including a seat cushion, a seatback, side bolsters, and a headrest, the method including a first preparation step of preparing a sensing device in the headrest to sense whether an occupant is on the seat and whether the occupant is snoring, a second preparation step of preparing a plurality of motors configured to change the positions and the orientations of the seat cushion, the seatback, the side bolster, and the headrest and preparing a plurality of air breathers in the seat cushion, the seatback, the side bolster, and the headrest, the plurality of air breathers being disposed separately from each other in a leftward-rightward direction of the respective seat cushion, seatback, side bolsters, and headrest, a sensing step of sensing, by the sensing device, whether the occupant is on the seat and whether the occupant is snoring, and a posture-changing step of changing the posture of the occupant by operating motors and air breathers selected from among the plurality of motors and the plurality of air breathers when it is determined in the sensing step that the occupant is snoring.

The sensing device prepared in the first preparation step may include, in order to sense whether the occupant is on the seat, a capacitance sensor mounted in the headrest, a first detection sensor mounted above the capacitance sensor to sense vibration and noise, and a second detection sensor mounted below the capacitance sensor to sense vibration and noise. The sensing step may include a first sensing process of sensing, by the capacitance sensor, whether the occupant is on the seat, and a second sensing process of sensing, by the first detection sensor and the second detection sensor, whether the occupant is snoring.

The second sensing process may include extracting a snoring-related waveform from waveforms of vibration and noise sensed by the first detection sensor and the second detection sensor to determine whether the occupant is snoring.

The posture-changing step may include a first posture-changing process of operating the plurality of motors to induce the occupant to lie back and a second posture-changing process of suctioning air into air breathers disposed on one side and discharging air from air breathers disposed on the opposite side, among the plurality of air breathers disposed separately from each other in the leftward-rightward direction of the occupant, to induce the occupant to lie on his/her side.

The second posture-changing process of the posture-changing step may include sensing whether another occupant is in the vehicle, suctioning air into air breathers disposed on the side on which the other occupant is located, and discharging air from air breathers disposed on the side opposite the side on which the other occupant is located to induce the occupant to lie on his/her side in the direction opposite the other occupant.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to preferred embodiments of the present invention, examples of which are illustrated in the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Wherever possible, the same reference numbers will be used throughout the drawings to refer to the same or like parts.

Before describing a seat for a vehicle according to the present invention, the cause of snoring and the solution thereto will be described first.

When the amount of air flowing through the respiratory tract is reduced while sleeping, snoring occurs due to excessive shaking of the uvula in the process of introducing a large amount of air into the respiratory tract.

One of the most common ways to solve snoring is to lie on one's side.

The present applicant has proposed the present invention based on the aforementioned way to solve snoring.

Figure 1:
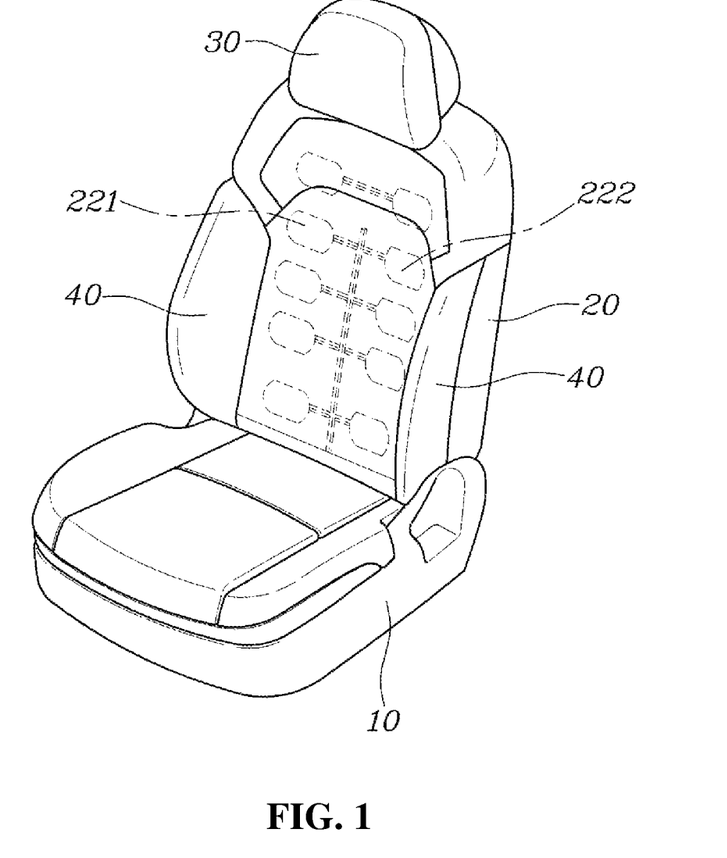
FIG. 1 is a perspective view showing a seat for a vehicle according to an embodiment of the present invention.
Figure 2:
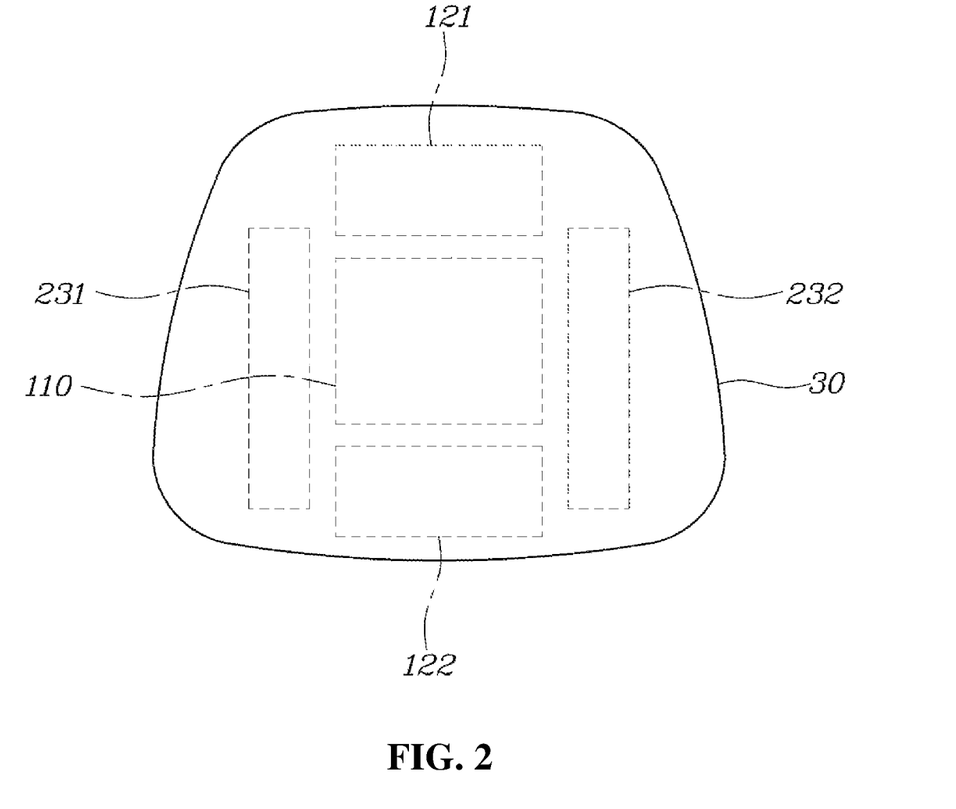
FIG. 2 is a view showing a headrest of the seat for a vehicle according to the embodiment of the present invention.
Figure 3:
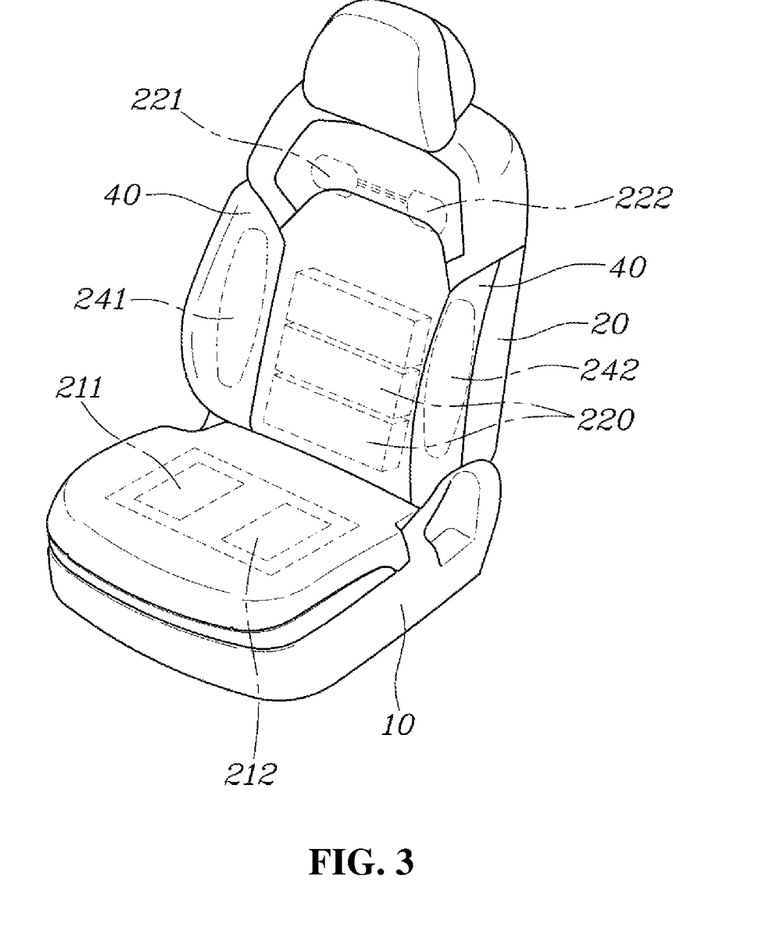
FIG. 3 is a view showing main components of the seat for a vehicle according to the embodiment of the present invention.
Figure 4:
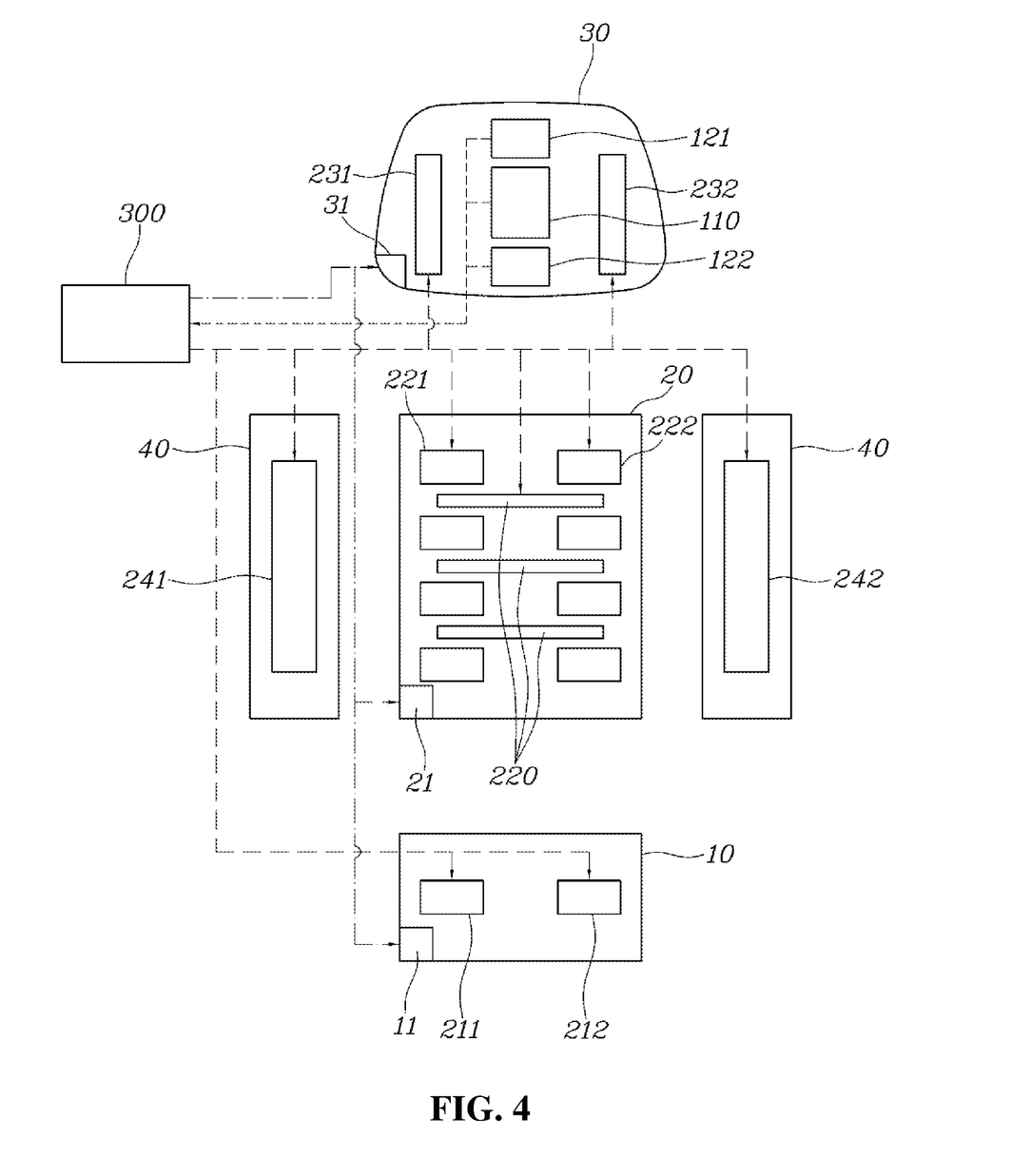
FIG. 4 is a view showing the configuration of the seat for a vehicle according to the embodiment of the present invention.

FIG. 1 is a perspective view showing a seat for a vehicle according to an embodiment of the present invention, FIG. 2 is a view showing a headrest of the seat for a vehicle according to the embodiment of the present invention, FIG. 3 is a view showing main components of the seat for a vehicle according to the embodiment of the present invention, and FIG. 4 is a view showing the configuration of the seat for a vehicle according to the embodiment of the present invention.

As shown in the drawings, a seat for a vehicle according to an embodiment of the present invention includes a seat cushion 10, a seatback 20, a side bolster 40, and a headrest 30. The seat further includes a sensing device mounted in the headrest 30 to sense whether an occupant is on the seat and whether the occupant is snoring, a posture-changing device mounted in at least one of the seat cushion 10, the seatback 20, the side bolster 40, or the headrest 30 to change the posture of the occupant, and a controller 300 configured to determine whether the occupant is on the seat and whether the occupant is snoring based on a sensing signal output from the sensing device and to operate the posture-changing device.

The seat cushion 10, the seatback 20, and the headrest 30, which constitute the seat for a vehicle according to this embodiment, may be implemented as components of a power seat, the orientation of which is changed by the operation of a motor. Accordingly, the position in a forward-backward direction, the height, and the tilt of the seat cushion 10, the angle of the seatback 20, and the position in an upward-downward direction and the position in the forward-backward direction of the headrest 30 may be changed using a plurality of motors. The present invention is not limited to any specific configuration of each of the seat cushion 10, the seatback 20, and the headrest 30 applied to this embodiment, and various methods of changing the orientations of these components using a plurality of motors may be used. Thus, a detailed description of a method of changing the orientations of the seat cushion 10, the seatback 20, and the headrest 30 is omitted.

The sensing device is a device for sensing whether an occupant is on the seat and whether the occupant is snoring. It is preferable for the sensing device to be disposed in the headrest 30, which is the closest to the head of the occupant, in which vibration and noise due to snoring occurs.

For example, the sensing device includes a capacitance sensor 110 mounted in the headrest 30, a first detection sensor 121 mounted above the capacitance sensor 110 in the headrest 30 to sense vibration and noise, and a second detection sensor 122 mounted below the capacitance sensor 110 in the headrest 30 to sense vibration and noise.

The capacitance sensor 110 is a sensor that senses a touch through a change of capacitance. When the occupant sits on the seat and the head of the occupant touches the headrest 30, the capacitance sensor 110 senses this touch. In this way, the capacitance sensor 110 senses whether the occupant is on the seat.

The first detection sensor 121 and the second detection sensor 122 are sensors for sensing vibration and noise. Specifically, when the occupant is snoring, the first detection sensor 121 and the second detection sensor 122 sense vibration generated from the skull of the occupant and snoring noise generated from the nose or the mouth of the occupant.

The reason why the first detection sensor 121 and the second detection sensor 122 are disposed above and below the capacitance sensor 110 is that vibration and noise are directly or indirectly sensed depending on the positions of the first detection sensor 121 and the second detection sensor 122 and that sensing signals output from the first detection sensor 121 and the second detection sensor 122 are compared to remove ambient noise, thereby extracting vibration and noise substantially caused by snoring.

For example, the second detection sensor 122 is disposed at a position corresponding to a portion of the headrest that is in direct contact with the skull of the occupant, thereby directly sensing vibration generated from the skull of the occupant and snoring noise generated from the nose or the mouth of the occupant. The first detection sensor 121 is disposed above the position corresponding to the portion of the headrest that is in direct contact with the skull of the occupant, thereby indirectly sensing vibration generated from the skull of the occupant and snoring noise generated from the nose or the mouth of the occupant.

The waveforms of vibration and noise sensed by the first detection sensor 121 and the second detection sensor 122 are compared to remove a waveform of ambient noise, thereby extracting waveforms of vibration and noise caused by snoring of the occupant. Accordingly, it is possible to determine whether the occupant is snoring, i.e. the sleeping state of the occupant, based on the extracted waveforms of vibration and noise.

The posture-changing device is a device that is mounted in at least one of the seat cushion 10, the seatback 20, the side bolster 40, or the headrest 30 to change the posture of the occupant. In this embodiment, the posture-changing device is implemented using a plurality of motors and a plurality of air breathers.

For example, the posture-changing device includes a plurality of motors.

Described in detail, the posture-changing device includes a cushion operation motor 11, which is provided in the seat cushion 10 to change the position in the forward-backward direction, the height, and the tilt of the seat cushion 10, a back operation motor 21, which is provided in the seatback 20 to change the angle of the seatback 20, and a headrest operation motor 31, which is provided in the headrest 30 to change the position in the upward-downward direction and the position in the forward-backward direction of the headrest 30.

The controller 300 controls the operation of the cushion operation motor 11, the back operation motor 21, and the headrest operation motor 31 in order to change the orientations of the seat cushion 10, the seatback 20, and the headrest 30, thereby changing the posture of the occupant.

In addition, the posture-changing device includes a plurality of air breathers. It is preferable for the plurality of air breathers to be disposed separately from each other in the leftward-rightward direction of the occupant.

Described in detail, the posture-changing device includes a first cushion air breather 211, mounted in the seat cushion 10 and disposed on the right side of the occupant, and a second cushion air breather 212, mounted in the seat cushion 10 and disposed on the left side of the occupant.

In addition, the posture-changing device further includes a first back air breather 221, mounted in the seatback 20 and disposed on the right side of the occupant, and a second back air breather 222, mounted in the seatback 20 and disposed on the left side of the occupant. In this case, the posture-changing device may further include a plurality of lumbar air breathers 220 mounted in the seatback 20 and disposed separately from each other in the upward-downward direction.

In addition, the posture-changing device further includes a first head air breather 231, mounted in the headrest 30 and disposed on the right side of the occupant, and a second head air breather 232, mounted in the headrest 30 and disposed on the left side of the occupant.

In addition, the posture-changing device further includes a first side air breather 241, mounted in the side bolster 40 and disposed on the right side of the occupant, and a second side air breather 242, mounted in the side bolster 40 and disposed on the left side of the occupant.

Accordingly, the controller 300 controls the operation of the air breathers, thereby changing the posture of the occupant.

Described in detail, under the control of the controller 300, the air breathers disposed at various positions are expanded by suctioning air thereinto, and are contracted by discharging air therefrom.

Among the air breathers disposed separately from each other in the leftward-rightward direction of the occupant, when the first cushion air breather 211, the first back air breather 221, the first head air breather 231, and the first side air breather 241, which are disposed on one side, e.g. the right side, are expanded by suctioning air thereinto and when the second cushion air breather 212, the second back air breather 222, the second head air breather 232, and the second side air breather 242, which are disposed on the opposite side, e.g. the left side, are contracted by discharging air therefrom, the posture of the occupant is changed such that the body of the occupant is tilted to the left and the occupant lies on his/her side in the leftward direction.

In this way, it is possible to suppress snoring of the occupant by inducing the occupant to lie on his/her side.

The controller 300 determines whether the occupant is on the seat and whether the occupant is snoring based on a sensing signal output from the sensing device, and controls the operation of the posture-changing device.

For example, upon determining that the occupant seated on the seat is snoring based on a sensing signal output from the sensing device, i.e. a signal from the capacitance sensor 110, which indicates that the occupant is on the seat, and signals from the first detection sensor 121 and the second detection sensor 122, which indicate that the occupant is snoring, the controller 300 operates the plurality of motors so as to induce the occupant to lie back.

In addition, the controller 300 changes the posture of the occupant by operating the air breathers disposed on the selected side among the air breathers disposed on the left side of the occupant and the air breathers disposed on the right side of the occupant among the plurality of air breathers.

The process performed by the controller 300 will be described in detail in connection with the description of a method of controlling the seat for a vehicle, which will be made below.

Hereinafter, a method of controlling the seat for a vehicle according to the present invention will be described.

The method of controlling the seat for a vehicle according to the present invention includes a step of preparing the sensing device and the posture-changing device described above in the seat for a vehicle.

Described in detail, the method of controlling the seat for a vehicle includes a first preparation step of preparing the sensing device in the headrest 30 to sense whether the occupant is on the seat and whether the occupant is snoring and a second preparation step of preparing the posture-changing device for changing the positions and orientations of the seat cushion 10, the seatback 20, the side bolster 40, and the headrest 30.

The sensing device prepared in the first preparation step includes the capacitance sensor 110, the first detection sensor 121, and the second detection sensor 122 described above.

The posture-changing device prepared in the second preparation step includes the plurality of motors and the plurality of air breathers described above.

Since the sensing device and the posture-changing device prepared in the first preparation step and the second preparation step have been described above in detail, a duplicate description thereof is omitted.

In the state in which the sensing device and the posture-changing device are prepared, a sensing step is performed such that the sensing device senses whether the occupant is on the seat and whether the occupant is snoring.

Described in detail, the capacitance sensor 110 of the sensing device senses whether the occupant is on the seat (a first sensing process), and the first detection sensor 121 and the second detection sensor 122 sense whether the occupant is snoring (a second sensing process).

Subsequently, the controller 300 determines whether the occupant is on the seat and whether the occupant is snoring using various sensing signals output from the sensing device.

In particular, the second sensing process includes extracting a snoring-related waveform from waveforms of vibration and noise sensed by the first detection sensor 121 and the second detection sensor 122 to determine whether the occupant is snoring.

When it is determined that the occupant is on the seat and is snoring, a posture-changing step is performed to change the posture of the occupant by operating the posture-changing device, i.e. motors and air breathers selected from among the plurality of motors and the plurality of air breathers.

The posture-changing step broadly includes a first posture-changing process of operating the plurality of motors to induce the occupant to lie back and a second posture-changing process of suctioning air into air breathers disposed on one side and discharging air from air breathers disposed on the opposite side, among the plurality of air breathers disposed separately from each other in the leftward-rightward direction of the occupant, to induce the occupant to lie on his/her side.

For example, in the first posture-changing process, the cushion operation motor 11 is operated to slide the seat cushion 10 to the foremost position and to change the height and the tilt of the seat cushion 10 to the lowest level. In addition, the back operation motor 21 is operated to move the seatback 20 to the rearmost position, whereby the body of the occupant is placed in the most comfortable position.

In addition, the headrest operation motor 31 is operated to move the headrest 30 to the lowest position and to move the same backwards. Accordingly, it is possible to accomplish an effect of reducing the height of a pillow, thereby widening the respiratory tract of the occupant, thus suppressing snoring.

At this time, changes in the orientations of the seat cushion 10, the seatback 20, and the headrest 30 are not limited to the changes described above. The orientations of the seat cushion 10, the seatback 20, and the headrest 30 may be changed to the orientations set in advance by the occupant.

In the second posture-changing process, among the air breathers disposed separately from each other in the leftward-rightward direction of the occupant, the first cushion air breather 211, the first back air breather 221, the first head air breather 231, and the first side air breather 241, which are disposed on one side, e.g. the right side, are expanded by suctioning air thereinto, and the second cushion air breather 212, the second back air breather 222, the second head air breather 232, and the second side air breather 242, which are disposed on the opposite side, e.g. the left side, are contracted by discharging air therefrom, whereby the posture of the occupant is changed such that the body of the occupant is tilted to the left and the occupant lies on his/her side in the leftward direction.

In addition, in the second posture-changing process, the plurality of lumbar air breathers 220 mounted in the seatback 20 is operated so that the body of the occupant is placed in a comfortable position.

In addition, the second posture-changing process includes sensing whether another occupant is in the vehicle, suctioning air into air breathers disposed on the side on which the other occupant is located, and discharging air from air breathers disposed on the side opposite the side on which the other occupant is located, thereby inducing the occupant to lie on his/her side in the direction opposite the other occupant. As such, since the body of the occupant is oriented in the direction opposite the other occupant, it is possible to ensure convenience of the other occupant even if the occupant snores.

The controller according to an exemplary embodiment of the present invention may be implemented through a processor (not shown) configured to execute the operations to be described below using a nonvolatile memory (not shown), which is configured to store an algorithm for controlling the operation of various components of a vehicle or data related to a software command for executing the algorithm, and using data stored in the corresponding memory. Here, the memory and the processor may be implemented as respective chips. Alternatively, the memory and the processor may be implemented as a single integrated chip. The processor may alternatively take the form of one or more processors.

As is apparent from the above description, according to the embodiment of the present invention, a seat for a vehicle is provided with a device for sensing whether an occupant is snoring and a device for changing the posture of the occupant so that the occupant lies on his/her side. Accordingly, when it is determined that the occupant is snoring, it is possible to induce the occupant to lie on his/her side, thereby enabling the occupant to get sound sleep.

As a result, a driver of an autonomous vehicle and another occupant in the vehicle are capable of getting sufficient sound sleep while the vehicle is traveling.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A seat for a vehicle, the seat comprising: a seat cushion; a seatback connected to the seat cushion; a first side bolster disposed on a right side of the seatback; a second side bolster disposed on a left side of the seatback; a headrest connected to the seatback; a sensing device mounted in the headrest to sense whether an occupant is on the seat and whether the occupant is snoring; a posture-changing device mounted in at least one of the seat cushion, the seatback, the side bolsters, or the headrest to change a posture of the occupant; and a controller configured to determine whether the occupant is on the seat and whether the occupant is snoring based on a sensing signal output from the sensing device and to operate the posture-changing device.

2. The seat of claim 1, wherein the sensing device comprises:
a capacitance sensor mounted in the headrest;
a first detection sensor mounted above the capacitance sensor in the headrest to sense vibration and noise; and
a second detection sensor mounted below the capacitance sensor in the headrest to sense vibration and noise.

3. The seat of claim 1, wherein the controller is configured to change the posture of the occupant by changing at least one of a position or an orientation of each of the seat cushion, the seatback, and the headrest depending on whether the occupant is on the seat and whether the occupant is snoring based on the sensing signal output from the sensing device.

4. The seat of claim 3, wherein the posture-changing device comprises a plurality of motors operated by the controller,
wherein the plurality of motors comprises:
a cushion operation motor disposed in the seat cushion to change the position of the seat cushion in a forward-backward direction, a height direction, and a tilt direction;
a back operation motor disposed in the seatback to change an angle of the seatback; and
a headrest operation motor disposed in the headrest to change the position of the headrest in an upward-downward direction and in the forward-backward direction, and
wherein the controller controls operation of the cushion operation motor, the back operation motor, and the headrest operation motor.

5. The seat of claim 1, wherein the posture-changing device comprises a plurality of air breathers operated by the controller, and
wherein the plurality of air breathers comprises:
a first cushion air breather mounted in the seat cushion and disposed on a right side of the seat cushion;
a second cushion air breather mounted in the seat cushion and disposed on a left side of the seat cushion;
a first back air breather mounted in the seatback and disposed on a right side of the seatback;
a second back air breather mounted in the seatback and disposed on a left side of the seatback;
a first head air breather mounted in the headrest and disposed on a right side of the headrest;
a second head air breather mounted in the headrest and disposed on a left side of the headrest;
a first side air breather mounted in the first side bolster; and
a second side air breather mounted in the second side bolster.

6. The seat of claim 5, wherein the plurality of air breathers further comprises a plurality of lumbar air breathers mounted in the seatback and disposed separately from each other in an upward-downward direction.

7. The seat of claim 5, wherein the controller is configured to change the posture of the occupant by operating one or more air breathers disposed on one or more of the respective left and right sides and selected among the plurality of air breathers depending on whether the occupant is snoring, as sensed by the sensing device.

8. A method of controlling a seat for a vehicle, the seat including a seat cushion, a seatback, side bolsters, and a headrest, the method comprising:
a first preparation step of preparing a sensing device in the headrest to sense whether an occupant is on the seat and whether the occupant is snoring;
a second preparation step of preparing a plurality of motors configured to change positions and orientations of the seat cushion, the seatback, the side bolsters, and the headrest and preparing a plurality of air breathers in the seat cushion, the seatback, the side bolsters, and the headrest, the plurality of air breathers being disposed separately from each other in a leftward-rightward direction of the respective seat cushion, seat back, side bolsters, and headrest;
a sensing step of sensing, by the sensing device, whether the occupant is on the seat and whether the occupant is snoring; and
a posture-changing step of changing a posture of the occupant by operating one or more motors and one or more air breathers selected from among the plurality of motors and the plurality of air breathers when it is determined in the sensing step that the occupant is snoring.

9. The method of claim 8, wherein the sensing device prepared in the first preparation step comprises, in order to sense whether the occupant is on the seat:
a capacitance sensor mounted in the headrest;
a first detection sensor mounted above the capacitance sensor to sense vibration and noise; and
a second detection sensor mounted below the capacitance sensor to sense vibration and noise, and
wherein the sensing step comprises:
a first sensing process of sensing, by the capacitance sensor, whether the occupant is on the seat; and a second sensing process of sensing, by the first detection sensor and the second detection sensor, whether the occupant is snoring.

10. The method of claim 9, wherein the second sensing process comprises extracting a snoring-related waveform from waveforms of vibration and noise sensed by the first detection sensor and the second detection sensor to determine whether the occupant is snoring.

11. The method of claim 8, wherein the posture-changing step comprises:
- a first posture-changing process of operating the plurality of motors to induce the occupant to lie back; and
- a second posture-changing process of suctioning air into air breathers disposed on one side and discharging air from air breathers disposed on an opposite side, among the plurality of air breathers disposed separately from each other in the leftward-rightward direction, to induce the occupant to lie on his/her side.

12. The method of claim 11, wherein the second posture-changing process of the posture-changing step comprises:
- sensing whether another occupant is in a vehicle; and
- suctioning air into one or more of the air breathers disposed on a side on which the other occupant is located and discharging air from one or more of the air breathers disposed on a side opposite the side on which the other occupant is located to induce the occupant to lie on his/her side in a direction opposite the other occupant.

* * * * *